United States Patent [19]

Gronholz

[11] Patent Number: 5,799,410
[45] Date of Patent: Sep. 1, 1998

[54] METHOD AND APPARATUS FOR SEPARATING VOLATILE COMPONENTS FROM A BASE MATERIAL

[75] Inventor: Claus Gronholz, Norderstedt, Germany

[73] Assignee: Umwelt-Technics-Nord GmbH, Norderstedt, Germany

[21] Appl. No.: 782,065

[22] Filed: Jan. 13, 1997

Related U.S. Application Data

[62] Division of Ser. No. 248,815, May 25, 1994, Pat. No. 5,592,753.

[30] Foreign Application Priority Data

May 25, 1993 [DE] Germany .............. 43 17 291.1

[51] Int. Cl.$^6$ ............................................. F26B 3/34
[52] U.S. Cl. ................................ 34/247; 34/410; 34/92
[58] Field of Search .................. 34/247, 330, 345, 34/410, 417, 92, 189, 202, 218; 373/151, 155, 156, 157; 126/390; 219/462, 621, 624, 634

[56] References Cited

U.S. PATENT DOCUMENTS

| | | | |
|---|---|---|---|
| 3,871,630 | 3/1975 | Wanetzky et al. | 266/156 |
| 4,086,084 | 4/1978 | Oliver et al. | 423/44 |
| 4,370,357 | 1/1983 | Swartz | 34/247 X |
| 4,609,430 | 9/1986 | Okamoto | 34/169 |
| 5,152,074 | 10/1992 | Kishi | 34/247 |
| 5,374,382 | 12/1994 | Nishiwaki et al. | 264/5 |
| 5,377,429 | 1/1995 | Sandhu et al. | 34/92 |

FOREIGN PATENT DOCUMENTS

| | | | |
|---|---|---|---|
| 39 37 331 | 7/1990 | Germany . | |
| 63-58199 | 3/1988 | Japan | 34/248 |
| 606063 | 5/1978 | U.S.S.R. | 219/652 |

*Primary Examiner*—Henry A. Bennett
*Assistant Examiner*—Steve Gravini
*Attorney, Agent, or Firm*—Faegre & Benson LLP

[57] ABSTRACT

The present invention provides a method and apparatus for separating volatile components from a base material. Specifically, the apparatus comprises a gas tight reactor, an induction heating vessel, a plate and evacuating means for evacuating volatile components from the reactor. The method comprises the steps of heating the material from which the volatile components are to be removed by induction heating in a gas tight vessel. More specifically, the area surrounding the object within the gas tight vessel is filled with metal filings which are then heated by induction heating. The metal filings thus inductively heat the object, causing any volatile components therein to be released. The volatile components are then evacuated from the gas tight vessel and the metal filings removed.

11 Claims, 2 Drawing Sheets

5,799,410

1

METHOD AND APPARATUS FOR SEPARATING VOLATILE COMPONENTS FROM A BASE MATERIAL

This is a divisional of U.S. patent application Ser. No. 08/248,815, filed May 25, 1994, U.S. Pat. No. 5,592,753 and entitled "METHOD AND APPARATUS FOR SEPARATING VOLATILE COMPONENTS FROM A BASE MATERIAL".

BACKGROUND OF THE INVENTION

The present invention relates to a method for separating volatile components from a particulate base material such as bore hole slurry or mud, soil material, and the like. The present invention also relates to a method for separating volatile components from a solid object, such as wood, metal, or the like. This invention also relates to apparatus for performing these methods of separating volatile components using induction heating.

Contaminated particulate base materials, such as soils or bore hole slurries, and contaminated solid objects, such as wooden railway beams, often need to be decontaminated by separating volatile contaminants therefrom.

It is an object of the present invention to provide a method and apparatus for separating volatile components from contaminated particulate base material and from contaminated solid objects, with minimal energy consumption.

The present invention and further developments thereof are defined in the appended claims.

BRIEF DESCRIPTION OF THE INVENTION

In the method of the present invention, the particulate base material is heated in a gas-tight reactor by means of induction heating. An induction vessel for containing the particulate base material within the gas-tight reactor is formed as an induction core. The internal space of the reactor is evacuated, a vacuum of 5 to 10 mbar, 0.5 mbar at the most being preferred. Due to the heating and the evacuation, the invention provides for almost complete removal of the volatile components from the base material. The residual volatile components are removed by means of an inert gas which is fed into the reactor, preferably injected into the base material, after the base material has been intensely agitated by means of a suitable agitator. To further facilitate efficient agitation and heating, the particulate base material may be admixed with metal filings and agitated. The metal filings are separated from the particulate base material.

Quite often solid objects of wood, metal or other materials are contaminated and for this reason have to be considered to be chemical waste which is to be disposed of in a very special manner if disposal is allowed at all. Accordingly, there is a need to decontaminate such objects. To this end the present invention provides a method for decontaminating such objects wherein the object is positioned in an induction vessel of a gas-tight reactor. The object is embedded in metal filings. The object can be positioned on the bottom of the vessel and the remaining space within the vessel can be filled with metal filings. However, it is preferred to completely embed the object within metal filings. As a result, the induction heat generated within the metal filings bed is effectively transferred onto the object so as to heat the object correspondingly. The internal space of the reactor is evacuated, a vacuum of 5 to 10 mbar, 0.5 mbar at the most being preferred. Due to the heating and the evacuation, the invention provides for almost complete removal of the

2 volatile components from the object. The residual volatile components are removed by means of an inert gas such as nitrogen which is injected into the filings. Before the object is removed, the metal filings are removed.

Preferably iron filings are used. They can be withdrawn from the induction vessel by magnetic means. Since the metal filings are also completely decontaminated, they can be reused indefinitely.

According to the present invention, a reactor for performing the above method for separating volatile components from a particulate base material includes an internal space for receiving an induction vessel for containing the base material with induction coil means being associated with the reactor. An agitator is disposed within the reactor. There are provided means for feeding a heating fluid such as thermal oil from outside of the reactor through the agitator. Furthermore, the agitator has agitator portions adapted to be immersed into the base material within the induction vessel and connected to an inert gas source. Very fine discharge openings within said agitator portions are provided to discharge inert gas into the base material. The base material within the induction vessel, which preferably is of circular shape, is heated by the induction heating of the induction vessel. Furthermore, the induction vessel may be in close heat contact with the bottom of the reactor which may also be formed as an induction core. Agitation of the material within the induction vessel ensures that fresh particles of the material always come into contact with the bottom and walls of the vessel. Furthermore, the agitator is heated by means of a thermal oil so that there is additional heating of the base material via the agitator. According to a further development of the present invention, such action is particularly effective if said agitator portions of the agitator are arranged so that they are immersible into the base material within the induction vessel from above. Said agitator portions are connected to a plate adapted to be positioned upon the base material from above, and the plate is connected to a hollow shaft extending from the reactor and including means for feeding said heating fluid and said inert gas into said induction vessel.

Since the volatile components are permanently removed, there is a corresponding reduction of the volume of the base material within the induction vessel. In order to ensure that the plate of the agitator is continuously in contact with the base material, the plate must be lowered accordingly. When the base material is loaded into the induction vessel the level of the base material is to be selected in accordance with the amount of volatile components present in the base material. This may be determined by taking samples before. It is important that the level of the base material within the induction vessel after removal of the volatile components will always be substantially the same. This ensures that the agitator portions always penetrate into the base material in an optimal manner, i.e. such as to be relatively slightly spaced from the bottom of the induction vessel. The shaft of the agitator is mounted so as to be axially adjustable, and it is moved axially by means of an adjusting drive so as to have the agitator follow the lowering level of the base material within the induction vessel.

According to a further development of the present invention simple adjusting means may comprise a sensor associated with the adjusting drive and sensing the force which the agitator exerts upon the base material, means being provided to control the adjusting drive in response to a signal from said sensor.

For the decontamination of solid objects an agitation of the metal filings is not envisaged. While this would be possible, it would not be very effective. The metal filings form heat conductors so that it is possible to immerse means through which a heating fluid such as thermal oil flows into the filings. However, inductive heating of the metal filings would not be sufficient to heat the object to a sufficiently high temperature.

According to a further development of the present invention a plate adapted to be actuated by a lifting device is disposed above the vessel which plate is adapted to be lowered upon the upper surface of the metal filings and includes portions to be immersed into the metal filings, said portions being connected to an inert gas source and including fine discharge openings for discharging inert gas. The plate may be arranged so as to have a certain spacing from the upper surface of the metal filings. When the volume of the object is reduced, the level of the metal filings within the vessel is lowered. The plate may be lowered correspondingly by the lifting device as was the case with the above described agitator. The plate and said portions may also serve as an induction core and may assist in transferring heat.

A further development of the invention provides that said reactor is of a double-wall construction and shaped so as to provide a meandering flow passage for receiving and pre-heating said heating fluid. The passage may be provided along the side walls and the top and may serve as a pre-heating means for heating the heating fluid such as thermal oil which thereafter flows into the agitator or the plate. This allows using the heat of the reactor walls for heating of the base material or the solid object. Furthermore, also the agitator or the plate may serve as an induction core and may be heated by induction heat. To this end further coil means may be provided which may be coiled for example transversely about the reactor.

As already mentioned, the level of the base material within the induction vessel is to be selected in accordance with the proportion of volatile components within the base material. To this end, the invention provides a metering and transferring container comprising a lower portion and an upper portion cooperating telescopically with said lower portion, securing means being provided to position said portions relative to each other in predetermined relative positions. The level of the metering and transferring container is adjusted in accordance with the percentage of volatile components within the base material. After the level has been adjusted, the metering and transferring container is filled with the base material flush with its upper edge. Thereafter, the induction vessel is loaded with the base material from the metering and transferring container. To this end the metering and transferring container may be provided with a displaceable bottom so that the induction vessel is to be positioned below the metering and transferring container in order to be loaded with the base material.

The vessel for solid objects need not necessarily be circular; it can be elongated for receiving for example elongated objects. Furthermore, it can be of fixed dimensions to allow for embedding of one or a plurality of objects within metal filings.

BRIEF DESCRIPTION OF THE DRAWINGS

The invention will be explained in more detail with reference to the accompanying drawings, wherein.

DETAILED DESCRIPTION OF THE INVENTION

Figure 1:
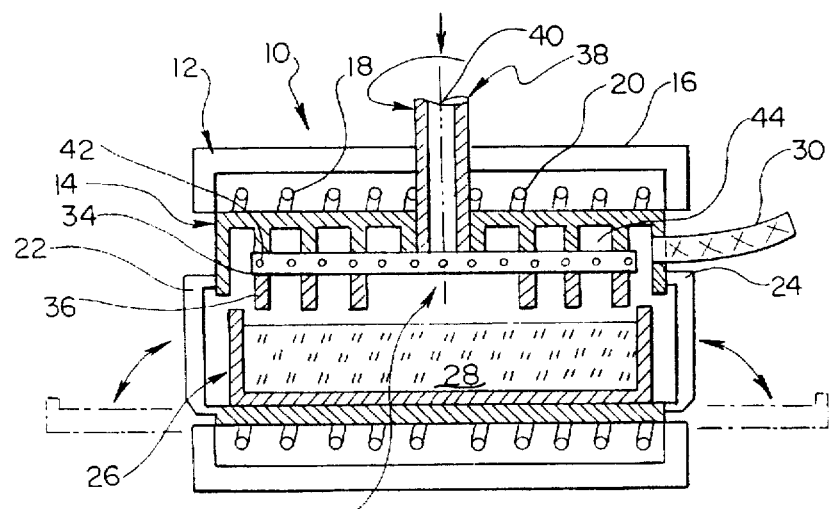
FIG. 1 is a schematic cross-section of a reactor for separating volatile components from a particulate base material.

FIG. 1 shows a reactor 10 including an external shell 12. An internal shell 14 is of an insulating structure and defines with the external shell 12 an annular space 16 receiving a pair of induction coils 18 and 20. The connections of the induction coils 18, 20 are not shown.

The reactor 10 is provided at opposite ends with flaps 22, 24 adapted to be pivoted about a lower horizontal axis. An open position of the flap is indicated by dash-dotted lines. When one of the flaps 22, 24 is in its open position, a tray-like induction vessel 26 may be inserted or removed. The induction vessel 26 is made of an electrically insulating material so that it may be heated by means of the coils 18, 22. The induction vessel 26 contains a particulate base material 28 which includes volatile contaminants.

The internal shell 14 is connected to a conduit 30 leading to a vacuum pump (not shown). An agitator 32 is disposed within the shell 14. The agitator 32 includes a circular plate 34 from which depend a row of agitator portions 36 which are parallel to the axis of the agitator 32. The plate 34 is connected to a hollow shaft 38 which extends through respective openings within the internal shell 14 and the external shell 12 and is adapted to be rotated by a suitable rotary drive. A tube 40 is disposed within the hollow shaft 38 and communicates with a source of inert gas, such as nitrogen (not shown). The tube 40 communicates with the agitator portions 36 via suitable passages (not shown). The agitator portions 36 include finely distributed orifices for discharging nitrogen into the base material 28 when the agitator portions 36 have been immersed therein. The interspace between the hollow shaft 38 and the tube 40 communicates with a source of thermal oil. Furthermore, it communicates with passages 42 within the plate 34 and the agitator portions 36 in order to heat them to a sufficient temperature.

Within the internal shell 14 there are provided passages 44 for pre-heating the thermal oil flowing therethrough, which oil thereafter is fed to the plate 34 and the agitator portions 36.

After the induction vessel 26 containing the particulate base material 28 has been inserted into the interior of the reactor, the agitator 32 is lowered until the plate 34 is in contact with the upper surface of the base material 28. To this end axial adjustments of the shaft 38 are necessary (not shown). This may be obtained by means of an (not shown) adjusting piston cylinder assembly or the like which for example exerts a predetermined biassing force and makes the plate 34 follow the lowering level of the base material 28. Furthermore, it is possible to provide a sensor for sensing the force by which the plate 34 is urged against the base material and which causes a lowering of the plate 34 when said force is below a predetermined value.

Energizing the coils 18, 20 will heat the induction vessel 26; rotation of the agitator 32 ensures that continuously fresh areas of the base material 28 will be in heat exchanging contact with the walls and the bottom of the vessel 26. Additional heating of the plate 34 by a heating fluid such as thermal oil will provide for additional heating of the base material. Furthermore, the plate 34 may be formed as an induction core.

During the above operation the internal space of the vessel is continuously evacuated via conduits 30, the vacuum being for example in the range from 5 to 10 mbar so that the volatile components leaving the base material 28 are continuously withdrawn.

This operation may be continued for example for 10 to 15 minutes. As soon as the volatile components have been substantially withdrawn, nitrogen is introduced into the tube 40; the nitrogen is heated by the hot agitator 32 and is discharged from the agitator portions 36 into the base material 28 so as to expel the residual volatile components.

Thereafter, the reactor is subjected to atmospheric pressure; one of the flaps 22, 24 is opened, and the induction vessel 26 is removed. A fresh induction vessel including contaminated base material is inserted through the other opened flap.

Figure 2:
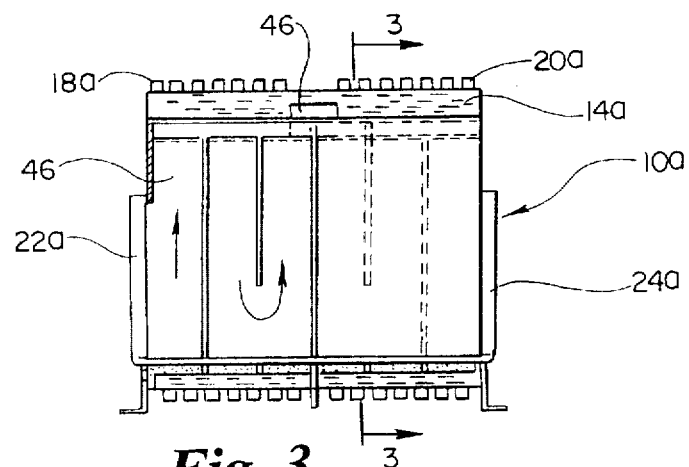
FIG. 2 is a cross-section of the side wall, the top and the bottom of another embodiment of a reactor.
Figure 3:
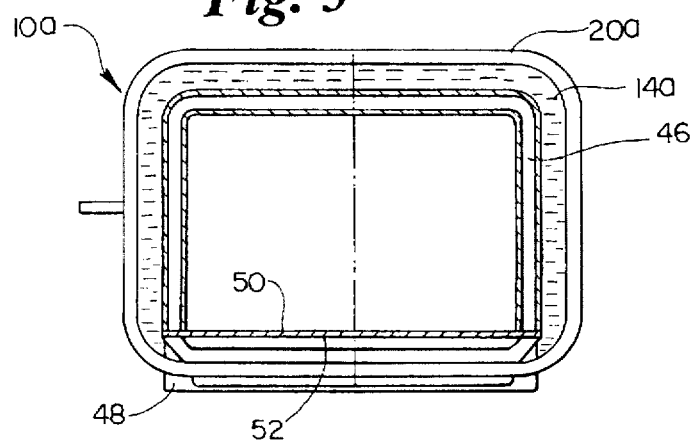
FIG. 3 is a cross-section of the reactor in FIG. 2 along lines 3—3.

FIGS. 2 and 3 show a reactor 10a similar to that in FIG. 1 and including an internal shell 14a of electrical insulating material which is provided with a pair of induction coils 18a and 20a. In FIG. 2 a hub 46 of shafts 38, 40 of FIG. 1 may be seen.

As is apparent from FIGS. 2 and 3, the side wall and the top of the internal space of the reactor 10a is provided with a meandering passage 46. A heating fluid may flow through the passage 46 so as to be heated by the side walls and the top in order to pre-heat the heating fluid which thereafter is introduced into the agitator. The heating fluid which may be for example a thermal oil may be of a temperature of 450° C. It enters the agitator 32 at a temperature of about 400° C.

As is also apparent from FIGS. 2 and 3, the reactor 10a is divided by a lower large rib 48 into two halves, with the coils 18a, 20a being disposed on both sides of the rib 48. Below the bottom 50 of the internal space of the reactor there are disposed a number of smaller ribs 52. The bottom 50 is also to be considered to be an induction core and is in close heat contact with the bottom of the induction vessel 28 according to FIG. 1.

Figure 4:
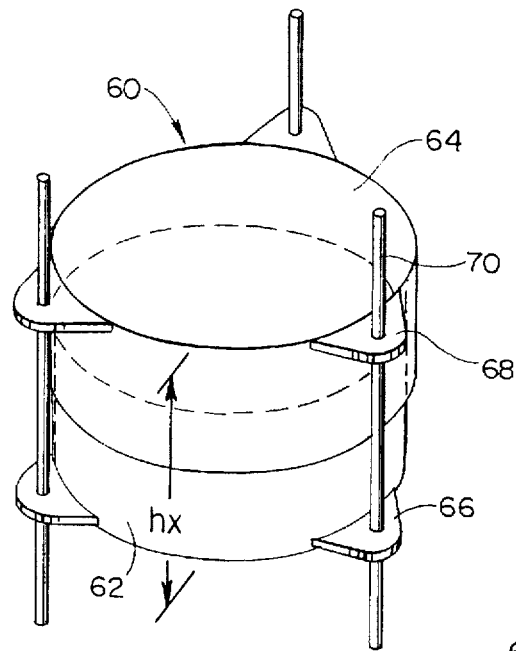
FIG. 4 is a perspective view of a metering and transferring container.
Figure 5:
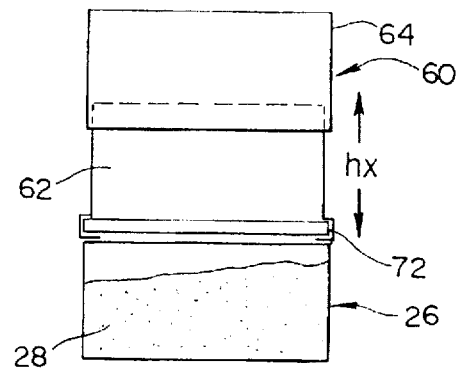
FIG. 5 is a side elevation of the container shown in FIG. 4.

FIG. 4 is a perspective view of a metering and transferring container 60 which comprises a circular lower portion 62 and a circular upper portion 64, with the upper portion 64 being arranged in telescopic relationship to the lower portion 62. The outer side of the portions 62, 64 include three circumferentially spaced lugs 66, 68 cooperating with spindles 70 so as to position the portions 62, 64 with respect to each other in predetermined relative positions. As is apparent from FIG. 5, the lower portion 62 is provided with a displaceable bottom 72. An induction vessel 26 is being positioned below the metering and transferring container 60 and may be filled from above by means of the container by displacing the bottom 72.

Before the metering and transferring container 60 is filled, it will be adjusted so as to assume a predetermined height hx, with this height depending on the proportion of the volatile components in the base material. The induction vessel 26 is loaded with the base material so that the level within the induction vessel 26 after removal of the volatile components will be always substantially the same. When the height hx has been adjusted, the container 60 is filled with the contaminated base material from above and thereafter is moved above the induction vessel 26 or the latter is moved below the container 60. Thereafter, the bottom 72 is removed so that the vessel 26 is loaded and may be introduced into the reactor 10 or 10a.

All the above operations may be performed automatically, such as inserting and removing the induction vessel 26 into and, respectively, from the reactor and adjusting the height of the metering and transferring container 60.

Figure 6:
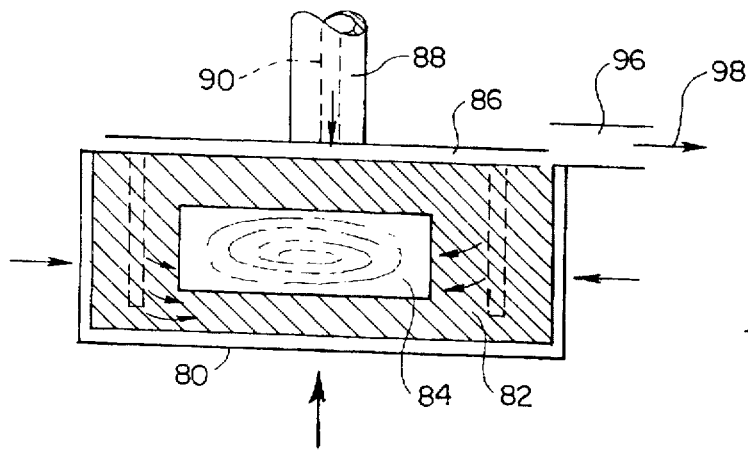
FIG. 6 is a schematic cross-section of another embodiment of a vessel and parts of a reactor according to the invention.
Figure 7:
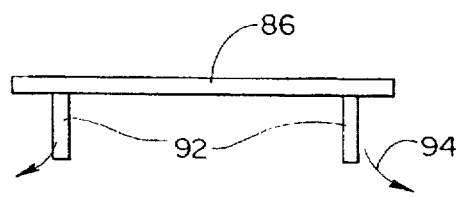
FIG. 7 is a schematic view of the plate in FIG. 6.

FIG. 6 shows a vessel 80 of preferably metallic material which may be of any shape such as circular, rectangular, elongated or the like. The vessel 80 contains metal filings, such as iron, 82 into which a contaminated piece of wood 84 such as a railway beam is embedded. The upper surface of the vessel 80 is covered by a plate 86 which is supported from a spindle 88. The spindle 88 is connected to a lifting device (not shown) and includes an axial bore as indicated by dotted lines 90. The bore may be connected to a (not shown) source of an inert gas such as nitrogen. As may be seen from FIG. 7, the under side of the plate includes a plurality of depending portions 92 which communicate with passages within the plate (not shown) and are provided with fine discharge orifices for discharging inert gas as indicated by arrows 94.

The vessel 80 may be positioned for example within a reactor according to FIG. 1 and is subjected to a vacuum as indicated by a conduit 96 and arrow 98 shown in FIG. 6. Furthermore, induction heating is obtained by a (not shown) induction coil, both the vessel 80 and the metal filings bed 82 being heated. The heat is transferred to the piece of wood 84. However, it cannot be inflamed because the atmosphere is substantially without any oxygen. Due to the vacuum, the volatile components are removed from the piece of wood 84. The volatile components may be completely expelled by the nitrogen which is fed through the above mentioned portions 92 as has been explained with reference to FIGS. 1 to 5.

Contrary to the above embodiment the plate 86 is not rotated. However, it is lowered when the level of the metal filings bed 82 is lowered as a result of a reduction of the volume of the workpiece being decontaminated. The position of the plate 86 may always be adjusted by suitable measures so that it rests upon the metal filings bed 82.

After the decontamination, the vessel 80 is removed from the reactor. Thereafter, the plate 86 is raised, and the iron filings bed 82 is withdrawn for example by means of a magnet. Thereafter, the piece of wood 84 can be removed.

What is claimed is:

1. A method for separating volatile components from a solid object by induction heating, which method comprises:
    a) positioning the solid object within an internal volume of an induction vessel of a gas-tight induction heating reactor, so that area around the object which does not contain the object is filled by metal filings;
    b) heating said object surrounded by said metal filings by induction heating while generating a vacuum within the internal volume of the induction vessel of the reactor;
    c) injecting an inert gas into said metal filings;
    d) evacuating volatile components from within said reactor; and
    e) removing metal filings from the object.

2. A method according to claim 1, wherein the solid object is wood, metal or the like and the object is embedded within the metal filings.

3. The method of claim 1, wherein said inert gas is nitrogen.

4. The method of claim 1, wherein said metal filings are iron filings which are magnetically removed from said object.

5. The method of claim 1, wherein said metal filings are reused.

6. An apparatus for separating volatile components from a solid object by induction heating, comprising:

a gas-tight reactor including at least one access opening for receiving an induction heating vessel, said gas-tight reactor operatively connected to an induction coil adapted and arranged for heating a solid object surrounded by metal filings within said vessel, a plate disposed within said gas-tight reactor above said induction vessel, said plate including:

vertical positioning mechanism adapted and arranged for vertical positioning of said plate;

portions adapted to be immersed into the metal filings;

small outlet openings in said portions for discharging inert gas into said metal filings; and said reactor provided with evacuating means for evacuating volatile components from said object.

7. The apparatus of claim 6, wherein said induction coil is wound about an electrically insulating shell.

8. The apparatus of claim 6, wherein said reactor is of a double-wall construction and shaped so as to provide a meandering flow passage for receiving and preheating a heating fluid within said flow passage.

9. The apparatus of claim 6, wherein said reactor has a bottom formed as an induction core.

10. The apparatus of claim 8 including induction coils disposed on a hollow shaft for said plate.

11. The apparatus of claim 6 including further induction coil means disposed on said reactor for heating said plate.

* * * * *